United States Patent [19]

Goss

[11] Patent Number: 4,752,634

[45] Date of Patent: Jun. 21, 1988

[54] HEAT RESISTANT HOT MELT PRECOAT AND ADHESIVE COMPOSITIONS

[75] Inventor: Raymond W. Goss, Newark, Del.

[73] Assignee: Hercules Incorporated, Wilmington, Del.

[21] Appl. No.: 853,292

[22] Filed: Apr. 17, 1986

[51] Int. Cl.$^4$ .................. C08K 5/01; C08L 91/06
[52] U.S. Cl. .................. 524/271; 524/487; 524/499; 524/521; 524/522; 524/523
[58] Field of Search ............... 524/270, 271, 487, 499

[56] References Cited

U.S. PATENT DOCUMENTS

| | | |
|---|---|---|
| 3,321,427 | 5/1967 | Tyran .................. 260/28.5 |
| 3,322,709 | 5/1967 | Hammer .................. 260/28.5 |
| 3,537,946 | 11/1970 | Truax et al. .................. 161/66 |
| 3,615,106 | 10/1971 | Flanagan et al. .................. 281/21 |
| 3,619,270 | 11/1971 | Tesch .................. 117/122 H |
| 3,660,335 | 5/1972 | Mason et al. .................. 260/28.5 |
| 3,849,353 | 11/1974 | Taft et al. .................. 524/271 |
| 3,850,858 | 11/1974 | Park .................. 524/271 |
| 3,860,543 | 1/1975 | Masuda et al. .................. 260/28.5 |
| 3,911,185 | 10/1975 | Wright .................. 428/97 |
| 3,914,489 | 10/1975 | Smedberg .................. 428/97 |
| 4,012,547 | 3/1977 | Smedberg .................. 428/97 |
| 4,076,670 | 2/1978 | Godfrey .................. 524/271 |
| 4,127,685 | 11/1978 | Busby et al. .................. 427/294 |
| 4,178,272 | 12/1979 | Meyer et al. .................. 524/271 |
| 4,358,557 | 11/1982 | Boggs .................. 524/271 |
| 4,367,113 | 1/1983 | Karim et al. .................. 524/271 |
| 4,430,468 | 2/1984 | Schumacher .................. 524/109 |
| 4,456,649 | 1/1984 | Clarke .................. 428/285 |
| 4,471,086 | 9/1984 | Foster .................. 524/487 |
| 4,500,681 | 2/1985 | Shulman .................. 525/222 |
| 4,568,713 | 2/1986 | Hansen et al. .................. 524/291 |

FOREIGN PATENT DOCUMENTS

| | | |
|---|---|---|
| 2452584 | 5/1976 | Fed. Rep. of Germany ...... 524/271 |
| 48069839 | 9/1983 | Japan . |
| 59-187069 | 10/1984 | Japan . |

*Primary Examiner*—Herbert J. Lilling
*Attorney, Agent, or Firm*—John E. Crowe

[57] ABSTRACT

Disclosed are hot melt compositions having good resistance to flow at temperatures up to 100° C. The compositions are homogenous blends, which consist essentially of (1) an ethylene—mono-unsaturated ester copolymer having a melt index from 2 to about 20, or an ethylene terpolymer having a melt index of from about 6 to about 20; (2) a heat resistant polymer having a crystalline melting point greater than 109° C.; (3) a tackifier resin having a Ring and Ball (R&B) softening point of from about 85° C. to about 110° C.; and (4) a hydrocarbon wax. When the tackifier resin has a R&B softening point of 100° C. to about 110° C., a naphthenic oil must also be added. The compositions may also contain a finely divided inorganic filler when used as an adhesive to produce pile fabrics or for backcoating the primary backing of a tufted carpet. The compositions are useful in the manufacture of carpets.

10 Claims, No Drawings

HEAT RESISTANT HOT MELT PRECOAT AND ADHESIVE COMPOSITIONS

This invention relates to the chemical art. In particular, this invention relates to heat resistant hot melt precoat and adhesive compositions.

Hot melt adhesives are employed in laminating various substrates such as paper, leather, cardboard, metal foils and the like.

Hot melt adhesives are used also as backsizing or backcoating adhesives in the manufacture of tufted carpets. The primary backing fabric of a tufted carpet is typically a woven or nonwoven fabric made of one or more of natural and synthetic fibers, such as jute, wool, rayon, polyamides, polyesters, polypropylene and polyethylene, or of films of synthetic materials, such as polypropylene, polyethylene and copolymers thereof.

The back of the primary backing fabric of a tufted carpet may be coated with a hot melt adhesive backcoat to assist in locking or anchoring the tufts to the primary backing material to help bond the primary backing fabric to the secondary backing fabric, to improve the dimensional stability of the tufted carpet, to make the carpet more durable and to provide skid and slip resistance.

Generally, the tufted carpet is further stabilized by laminating a secondary backing, such as jute, woven or nonwoven fabrics made from polypropylene, polyethylene and copolymers thereof, to the tufted carpet.

The hot melt adhesive, in a molten state, is distributed uniformly across the back side of a tufted carpet which has carpet yarn stitched to a backing material. Thereafter, the adhesive is solidified by cooling to room temperature. Such use of hot melt adhesives is illustrated in U.S. Pat. No. 3,583,936.

Carpets bonded with a hot melt adhesive generally use a a mixture of an ethylene-vinyl acetate copolymer, a tackifying resin and a wax as a precoat composition, which is applied to the primary backing prior to backcoating the backing fabric with the hot melt adhesive. The precoat is applied in an amount sufficient to penetrate the individual tufts of yarn thereby increasing the resistance of the tufts to pull-out, known as tuft-bond strength or pile-bond strength, and enhancing the bonding of the primary backing fabric to the backcoating adhesive. The amount of precoat necessary to penetrate the individual tufts will vary depending on the carpet yarn density and the efficacy of the precoat. However, while such compositions tend to improve the tuft-bond strength they suffer from lack of heat resistance and soften during the dyeing and annealing steps.

Hence, there is a need for a precoat and hot melt adhesive composition which provides not only tuft bond strength, but is sufficiently heat resistant to retain its integrity during the dyeing and annealing operations.

In accordance with this invention, there are provided hot melt adhesive compositions having a Brookfield viscosity of from about 10,000 to about 200,000 centipoise (cps) at about 140° C. to about 180° C. and consist essentially of, by weight, (1) from 10 parts to 40 parts of an ethylene copolymer or ethylene terpolymer; (2) from 10 parts to 30 parts of a heat resistant polymer having a crystalline melting point greater than 109° C.; (3) from 30 parts to 50 parts of a tackifier resin having a R&B softening point of from about 85° C. up to 110° C.; and (4) from 1 parts to 5 parts of a hydrocarbon wax.

The composition of this invention when used as a precoat or hot melt adhesive backcoat in the manufacture of tufted carpets, provide carpet which is resistant to flow at temperatures up to 100° C., and, depending on the various residence times for the annealing and the piece dyeing operations, has good resistance over 100° C., has improved tuft-bond strength, narrowed statistical variation in the tuft bond values and increased stiffness and durability. The combination of components (1), (2), (3) and (4) in the amounts set forth above are essential to producing the composition of this invention. One cannot vary the components or the amounts as defined herein without sacrificing the good balance of properties.

The compositions of this invention can also be used as a hot melt adhesive for bonding fibers to a backing, such as backing for carpets, to produce pile fabrics in accordance with the process of U.S. Pat. No. 4,017,345, the disclosure of which is incorporated by reference. By this method, known as single-end implantation, single carpet fibers are interfaced perpendicularly on the surface of the carpet backing that has been precoated with an adhesive layer for bonding the carpet fibers and backing together. This technique saves approximately 20% of the total fiber cost and also has demonstrated energy as well as manufacturing cost advantages.

The hot melt compositions of this invention are particularly useful as a precoat for backcoating the primary backing of a tufted carpet and in bonding fibers to carpet backing to produce pile fabrics. The tufted carpets and pile fabrics produced with the compositions of this invention reta in their integrity during standard carpet dyeing and printing operations at 100° C.

In another embodiment of this invention from about 30 parts to about 50 parts of a tackifier resin having a R&B softening point of from 100° C. to about 110° C. can be used as component (3) provided from about 6 parts to about 12 parts of a softening agent, i.e. naphthenic oil is added as component (5) in addition to components (1), (2) and (4) as set forth herein above.

Preferably the compositions have a Brookfield viscosity from about 50,000 to 100,000 cps at about 140° C. to about 163° C.

Component (1) can be an ethylene copolymer having a melt index from about 2 to about 50, preferably from about 25 to about 30. Typically, ethylene is polymerized with a mono-unsaturated ester, such as vinyl esters of $C_{1-4}$ carboxylic acids and $C_{1-5}$ alkyl esters of acrylic acid and methacrylic acid. Suitable vinyl esters of $C_{1-4}$ carboxylic acids include vinyl acetate, vinyl formate, vinyl propionate and vinyl butyrate. Suitable $C_{1-5}$ alkyl esters of acrylic acid and methacrylic acid include methyl methacrylate, ethyl methacrylate, ethyl acrylate and isopropyl acrylate.

The ethylene--mono-unsaturated ester copolymers which can be used in this invention contain, by weight of the copolymer, from about 67% to about 82% ethylene and from about 33% to about 18% vinyl ester, alkyl acrylate or methacrylate. Typically, the polymerized ethylene content is from about 72% to about 75% and the mono-unsaturated ester content is from about 28% to about 25% when the ethylene is polymerized with a vinyl ester of a $C_{1-4}$ carboxylic acid. When a $C_{1-5}$ alkyl ester of acrylic acid or a $C_{1-5}$ alkyl ester of methacrylic acid is used, the desired ethylene content is, by weight, from about 77% to about 82%, and the desired alkyl acrylate or alkyl methacrylate content is from about 23% to about 18%. Ethylene-vinyl acetate, ethylene-ethyl acrylate and ethylene-methyl methacrylate copolymers are preferred.

Component (1) can also be an ethylene terpolymer having a melt index from about 6 to about 20, preferably from about 5 to about 7. Especially desirable terpolymers are those prepared by polymerizing ethylene, a vinyl ester of a $C_{1-4}$ carboxylic acid and a mono- or di-unsaturated termonomer. Typically, the ethylene terpolymer contains, by weight of the terpolymer, from about 74% to about 76% ethylene, from about 23% to about 26% vinyl ester, and from about 1% to about 3% of a termonomer, such as acrylic acid, methacrylic acid, itaconic acid, acrylamide, beta dimethylaminoethyl methacrylate, beta hydroxyethyl acrylate, diallyl maleate, diallyl phthalate, diallyl ether or ethylene glycol dimethacrylate. Suitable vinyl esters of $C_{1-4}$ carboxylic acids are set forth above. Vinyl acetate is the preferred vinyl ester and methacrylic acid is the preferred termonomer. Preferably the ethylene terpolymer contains, by weight, 74% ethylene, 25% vinyl ester, and 1% of a termonomer.

Component (2) is a heat resistant polymer which must have a crystalline melting point greater than 109° C. to about 148° C., preferably 109.5° C. to about 129° C. Suitable heat resistant polymers include polybutylene having a melt index from about 2 to about 20, preferably from about 4 to about 10; propylene-butylene copolymers having a melt index of from about 4 to about 250, preferably from about 100 to about 240; and low density polyethylene having a melt index of from about 1 to about 40, preferably from about 20 to about 25, provided these polymers also have a crystalline melting point greater than 109° C. to about 149° C. A mixture of two or more heat resistant polymers can be used if desired provided the mixture has the above crystalline melting point. If the crystalline melting point is less than 109° C., the hot melt composition formed therewith cannot withstand the normal annealing and piece dyeing temperatures used in the manufacture.

Only one commercially available low density polyethylene has a crystalline melting point greater that 109° C., that is, NPE 853 of Norchem Chemical Co. Up until this became available around 1980, the only low density polyethylenes available had melting points from 80° to 100° C.

Component (3) is a tackifier resin, which is a term of art for low molecular weight resins that modify the performance of the composition. Tackifier resins for hot melt adhesives are well known in the art. Suitable tackifier resins for use in this invention include rosin, esters of rosin, aliphatic hydrocarbon resins prepared by polymerizing non-terpenic $C_{4-9}$ unsaturated hydrocarbon monomers and by polymerizing unsaturated hydrocarbon monomer mixtures or streams formed by cracking petroleum, terpene resins and mixtures thereof having a R&B softening point of from about 85° C. to about 110° C., preferably from about 90° C. to about 103° C.

Typical esters of rosin include the glycerol ester of hydrogenated (partially or substantially completely) rosin, and the pentaerythritol ester of hydrogenated (partially or substantially completely) rosin.

The rosin used to prepare the esters of rosin that can be used in this invention can be any of the commercially available types of rosin such as wood rosin, gum rosin, tall oil rosin and mixtures thereof in their crude or refined state.

Typical aliphatic hydrocarbon resins include low molecular weight homopolymers and copolymers of non-terpenic unsaturated hydrocarbon monomers having 4–9 carbon atoms, preferably 4–6 carbon atoms, such as butene-1, isobutylene, butadiene, isoprene, and pentene-1.

Suitable aliphatic unsaturated hydrocarbon resins prepared by polymerizing unsaturated hydrocarbon monomer mixtures or streams formed by cracking petroleum or petroleum refining include the component mixture of a five carbon to nine carbon stream from petroleum refining, commonly referred to as a $C_5$–$C_9$ stream. Hence, the resins prepared from such a stream are commonly referred to as $C_5$–$C_9$ resins. The components of a $C_5$–$C_9$ stream are aliphatic and aromatic hydrocarbon compounds, both normal and branched, in which the number of carbons does not exceed nine. Other suitable resins include hydrocarbon resins substantially free of polymerized aromatics prepared by polymerizing the monomer mixture of a five carbon monomer stream from petroleum refining, the monomers being primarily aliphatic. These resins are commonly referred to as $C_5$ resins. The primary monomers of $C_5$ resins are di- and mono-olefins of both natural and branched five carbon components and the mono-olefins of six carbon components. The preferred tackifier resin is a $C_5$ resin.

Suitable terpene resins include polyterpene resins derived from alpha-pinene, beta-pinene, and monocyclic terpenes such as dipentene.

Component (4) is a hydrocarbon wax having a melting point of from about 110° C. to about 125° C., preferably from about 112° C. to about 118° C. Suitable waxes for this purpose are the synthetic waxes, such as homopolymers of ethylene, having a viscosity of from about 40 cps to about 60 cps at 149° C.

Component (5) is a naphthenic oil. Naphthenic oil contains hydrocarbons of high molecular weight in the form of a heavy, viscous, transparent, odorless liquid of low volatility and has a specific gravity of from about 0.8990 to about 0.9315 and a Saybolt Universal viscosity at 38° C. of from about 400 seconds to about 600 seconds.

When the composition is to be used as an adhesive in single-end implantation and component (1) is an ethylene copolymer, the composition can contain, by weight based on the total weight of components, up to about 50 parts, preferably from about 25 parts to about 35 parts, of a finely divided inorganic filler having a particle size distribution wherein 93±2% of the filler passes through a U.S. #325 Wet Sieve. Suitable fillers for hot melt adhesives are well known in the art and include calcium carbonate, barium carbonate, barium sulfate, calcium silicate, magnesium silicate, aluminum silicate, clay, talc, wood flour, and hydrated alumina. The preferred filler is calcium carbonate.

When the composition is to be used for backcoating the primary backing of tufted carpet and component (1) is an ethylene copolymer, the composition can contain up to 85 parts, preferably from about 65 parts to about 75 parts, of finely divided inorganic filler.

Preferably the hot melt compositions of this invention consist essentially of from about 10 parts to about 20 parts of ethylene copolymer as component (1); from about 14 parts to about 30 parts of component (2); from about 32 parts to about 47 parts of component (3); from about 3.0 parts to about 7.5 parts of component (4); and, optionally, from about 20 parts to about 50 parts of a particulate filler, based on the total weight of components. If component (3) has a R&B softening point from 100° to about 110° C., from about 3 parts to about 4.2 parts of component (5) must be present.

It is recommended that the hot melt composition also contain, by weight based on the total weight of components, from about 0.25 pph to about 1 pph parts of a stabilizer or antioxidant when it is to be used as a hot melt adhesive, preferably from about 111° C. to about 125° C. to enhance the pot-life. Typical stabilizers are 2,4,6-tri- alkylated monohydroxy phenols, 4,4'-thio-bis(6-tertiary butyl m-cresol), butylated hydroxy anisole, butylated hydroxy toluene, (methylene 3-)3,5-di-tert-butyl-1-4-(should this be dihydroxy?)hydroxyphenyl proprionate, and tetrapentaerythritol ester of 3,5-di-t-butyl-4-hydroxyhydrocinnamic acid.

In addition, small amounts of other conventional additives, such as colorants, odorants, adhesive promoters and lubricants, can be included in the composition.

The adhesive composition is prepared by melt blending the components and, subsequently, cooling the essentially homogeneous blend to room temperature.

The following examples are illustrative of a hot melt compositions of this invention. All parts and percentages used in this disclosure are by weight unless otherwise indicated.

EXAMPLE 1

The following components are melt blended in a five gallon container by aerating at 160° C. to provide a hot melt adhesive composition having good cohesive strength at 100° C.

| Components | Parts |
| --- | --- |
| Terpolymer of 74% ethylene, 25% vinyl acetate, and 1% methacrylic acid | 100.0 |
| Polybutylene (m pt 123° C.) | 100.0 |
| C$_5$ resin (Ring & Ball s pt 95° C.) | 234.0 |
| Naphthenic Oil (sp grav 0.87; viscosity at 38° C. 202 S.U. units) | 47.0 |
| Polyethylene wax (m pt 115° C.) | 18.0 |
| Tetrapentaerythritol ester of 3,5-di-t-butyl-4-hydroxy-hydrocinnamic acid (m pt 103–108° C.) | 1.25* |

*Based on the total weight of the first five components listed above.

EXAMPLE 2

The first five of the following components are melt blended in a five gallon container by aerating at 160° C. The last component below, a filler, is then added to the blend to provide a hot melt adhesive composition having good cohesive strength at 100° C.

| Components | Parts |
| --- | --- |
| Copolymer of 75% ethylene and 25% vinyl acetate | 100.0 |
| Polybutylene (m pt 123° C.) | 100.0 |
| C$_5$ resin (Ring & Ball s pt 95° C.) | 234.0 |
| Naphthenic oil (sp grav 0.87; viscosity at 38° C. 202 S.U. units) | 47.0 |
| Polyethylene wax (m pt 115° C.) | 20.0 |
| Calcium Carbonate | 214.0* |

*Based on the total weight of the first five components listed above.

EXAMPLE 3

The following components are melt blended in a five gallon container by aerating at 160° C. to provide a hot melt adhesive composition having good cohesive strength at 100° C.

| Components | Parts |
| --- | --- |
| Copolymer of 82% ethylene and 18% ethyl acrylate | 100.00 |
| Polybutylene (m pt 123° C.) | 129.0 |
| C$_5$ resin (Ring & Ball s pt 95° C.) | 267.0 |
| Naphthenic oil (sp grav 0.87; viscosity at 38° C. 202 S.U. units) | 54.0 |
| Polyethylene wax (m pt 115° C.) | 21.0 |
| Tetrapentaerythritol ester of 3,5-di-t-butyl-4-hydroxy-hydrocinnamic acid (m pt 103–108° C.) | 1.42* |

EXAMPLE 4

The following components are melt blended in a five gallon container by aerating at 160° C. to provide a hot melt adhesive composition having good cohesive strength at 100° C.

| Components | Parts |
| --- | --- |
| Copolymer of 67% ethylene and 33% vinyl acetate | 100.0 |
| Propylene-butylene copolymer (m pt 143° C.) | 129.0 |
| C$_5$ resin (Ring & Ball s pt 95° C.) | 267.0 |
| Naphthenic oil (sp grav 0.87; viscosity at 38° C. 202 S.U. units) | 54.0 |
| Polyethylene wax (m pt 115° C.) | 21.0 |
| Tetrapentaerythritol ester of 3,5-di-t-butyl-4-hydroxy-hydrocinnamic acid (m pt 103–108° C.) | 1.42* |

*Based on the total weight of the first five components listed above.

EXAMPLE 5

The following components are melt blended in a five gallon container by aerating at 160° C. to provide a hot melt adhesive composition having good cohesive strength at 100° C.

| Components | Parts |
| --- | --- |
| Copolymer of 67% ethylene and 33% vinyl acetate | 100.0 |
| Low density polyethylene (m pt 109° C.) | 300.0 |
| C$_5$ resin (Ring & Ball s pt 95° C.) | 468.0 |
| Naphthenic oil (sp grav 0.87; viscosity at 38° C. 202 S.U. units) | 95.0 |
| Polyethylene wax (m pt 115 C.) | 37.0 |
| Tetrapentaerythritol ester of 3,5-di-t-butyl-4-hydroxy-hydrocinnamic acid (m pt 103–108° C.) | 2.5* |

*Based on the total weight of the first five components listed above.

EXAMPLE 6

The following components are melt blended in a five gallon container by aerating at 160° C. to provide a hot melt adhesive composition having good cohesive strength at 100° C.

| Components | Parts |
| --- | --- |
| Copolymer of 82% ethylene and 18% ethyl acrylate | 100.0 |
| Propylene-butylene copolymer (m pt 143° C.) | 129.0 |
| C$_5$ resin (Ring & Ball s pt 95° C.) | 267.0 |
| Naphthenic oil (sp grav 0.87; viscosity at 38° C. 202 S.U. units) | 54.0 |
| Polyethylene wax (m pt 115° C.) | 21.0 |

| Components | Parts |
| --- | --- |
| Tetrapentaerythritol ester of 3,5-di-t-butyl-4-hydroxy-hydrocinnamic acid (m pt 103–108° C.) | 1.4* |

*Based on the total weight of the first five components listed above.

Thus, this invention provides hot melt precoat and adhesive compositions which have good resistance to flow at temperatures up to 100° C. and, therefore, good cohesive strength at 100° C.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim and desire to secure by Letters Patent is:

1. A composition having a Brookfield viscosity of from about 10,000 to about 200,000 centipoise at from about 140° C. to about 180° C., comprising by weight:
   (1) from 10 parts to about 40 parts of an ethylene polymer selected from the group consisting of
      (i) an ethylene copolymer having a melt index from 2 to about 50, and, by weight of the copolymer, an ethylene content of from about 67% to about 82% and a mono-unsaturated ester content of from about 33% to about 18%, and
      (ii) an ethylene terpolymer having a melt index of from about 6 to about 20, and, by weight of the terpolymer, from about 74% to about 76% ethylene, from about 23% to about 26% vinyl ester, and from about 1% to about 3% of a termonomer selected from the group consisting of acrylic acid, methacrylic acid, itaconic acid, acrylamide, beta dimethylaminoethyl methacrylate, beta hydroxyethyl acrylate, diallyl maleate, diallyl phthalate, diallyl ether and ethylene glycol dimethacrylate;
   (2) from 10 parts to about 30 parts of a heat-resistant polymer having a crystalline melting point greater than 109° C. selected from the group consisting of polybutylene and propylene-butylene copolymer
   (3) from about 30 parts to about 50 parts of a tackifier resin having a Ring and Ball softening point of from about 85° C. up to about 110° C.; and
   (4) from about 1 part to about 5 parts of a hydrocarbon wax.

2. The composition of claim 1 wherein component (1) is an ethylene-mono-unsaturated ester copolymer having a melt index of about 25 to about 30.

3. The composition of claim 1 wherein the component (1) is a member selected from the group consisting of a vinyl ester of $C_{1-4}$ carboxylic acid, a $C_{1-5}$ alkyl ester of acrylic acid, and a $C_{1-5}$ alkyl ester of methacrylic acid.

4. The composition of claim 1 wherein component (1) is an ethylene terpolymer.

5. The composition of claim 1 wherein component (2) is a polybutylene.

6. The composition of claim 1 wherein component (2) is a propylene-butylene copolymer.

7. The composition of claim 1 wherein component (3) is a member selected from the group consisting of rosin, an ester of rosin and an aliphatic hydrocarbon resin prepared by polymerizing
   (i) a non-terpenic $C_{4-9}$ unsaturated hydrocarbon monomers or
   (ii) an unsaturated hydrocarbon monomer obtained from a petroleum refining stream; terpene resin; and mixtures thereof.

8. A composition of claim 1 having a Brookfield viscosity of from about 20,000 to about 200,000 centipoise and containing from about 6 parts to about 12 parts of a softening agent.

9. The composition of claim 1 wherein component (1) is present in an amount of from about 10 parts to about 20 parts; component (2) is present in an amount of from about 14 parts to about 30 parts; component (3) is present in an amount of from about 32 parts to about 47 parts; and component (4) is present in an amount of from about 3 parts to about 4.2 parts by weight.

10. The composition of claim 9 containing a naphthene oil present in an amount of from about 7.5 parts to about 9 parts.

* * * * *

UNITED STATES PATENT AND TRADEMARK OFFICE
CERTIFICATE OF CORRECTION

PATENT NO.   : 4,752,634
DATED        : June 21, 1988
INVENTOR(S)  : GOSS

It is certified that error appears in the above-identified patent and that said Letters Patent are hereby corrected as shown below:

Column 1, Line 67

"up to 110° C." should read  --up to about 110° C.--

Column 6, Line 15, insert

"*Based on the total weight of the first five components listed above."

Signed and Sealed this

Fourth Day of October, 1988

*Attest:*

DONALD J. QUIGG

*Attesting Officer*   *Commissioner of Patents and Trademarks*